(12) United States Patent
Bolin et al.

(10) Patent No.: US 9,164,503 B2
(45) Date of Patent: Oct. 20, 2015

(54) METHOD OF OPTIMIZING TOOLPATHS USING MEDIAL AXIS TRANSFORMATION

(75) Inventors: Jared Lee Bolin, Millstadt, IL (US); Philip L. Freeman, Maryland Heights, MO (US)

(73) Assignee: THE BOEING COMPANY, Chicago, IL (US)

( * ) Notice: Subject to any disclaimer, the term of this patent is extended or adjusted under 35 U.S.C. 154(b) by 589 days.

(21) Appl. No.: 13/549,092

(22) Filed: Jul. 13, 2012

(65) Prior Publication Data
US 2014/0018953 A1 Jan. 16, 2014

(51) Int. Cl.
G05B 19/18 (2006.01)
G05B 19/4093 (2006.01)

(52) U.S. Cl.
CPC .. *G05B 19/4093* (2013.01); *G05B 2219/34113* (2013.01); *G05B 2219/35037* (2013.01); *G05B 2219/35098* (2013.01)

(58) Field of Classification Search
CPC ...................................................... B22D 11/18
USPC ........................................................ 700/187
See application file for complete search history.

(56) References Cited

U.S. PATENT DOCUMENTS

| | | | |
|---|---|---|---|
| 5,023,920 | A | 6/1991 | Breu |
| 6,089,743 | A | 7/2000 | McQuinn |
| 8,000,834 | B2 | 8/2011 | Diehl et al. |
| 8,024,159 | B2 | 9/2011 | Sims, Jr. et al. |
| 2004/0091143 | A1 | 5/2004 | Hu |
| 2005/0246052 | A1 | 11/2005 | Coleman et al. |
| 2008/0182017 | A1 | 7/2008 | Singh et al. |
| 2010/0087949 | A1 | 4/2010 | Coleman et al. |

OTHER PUBLICATIONS

Yao "A Novel Cutter Path Planning Approach to High Speed Machining" Computer-Aided Design & Applications, vol. 3 Nos. 1-4 2006. pp. 241-248.*
Shaked et al., "Pruning Medial Axes" Computer Vision and Image Understanding vol. 69 No. 2 Feb. 1998. pp. 156-169.*
Quadros et al., "Skeletons for Representation and Reasoning in Engineering Applications" Engineering with Computers, vol. 17 2001 pp. 186-198.*
Persson "NC machining of arbitrarily shaped pockets" Computer-Aided Design. IPC Business Press. vol. 10 No. 3 May 1978. pp. 169-174.*
Kramer "Pocket Milling with Tool Engagement Detection" Journal of Manufacturing Systems. vol. 11, Issue 2, 1992, pp. 114-123.*
Stori et al., "Constant Engagement Tool Path Generation for Convex Geometries" Journal of Manufacturing Systems. vol. 19, Issue 3, 2000, pp. 172-184.*
Held et al., "A smooth spiral tool path for high speed machining of 2D pockets" Computer-Aided Design. vol. 41, pp. 539-550.*
Extended European Search Report, dated Nov. 25, 2014, regarding Application No. EP13173511.0, 8 pages.

(Continued)

*Primary Examiner* — Mohammad Ali
*Assistant Examiner* — Emilio J Saavedra
(74) *Attorney, Agent, or Firm* — Yee & Associates, P.C.

(57) ABSTRACT

Rough machining of a workpiece is performed by a numerically controlled machine tool using an adaptive toolpath technique. Material removal rate and machine efficiency are increased by forming a pre-roughing slot in the workpiece along medial axes, and machining the remainder of the workpiece using a toolpath that begins inside the pre-roughing slot and spirals outwardly in smooth curves.

22 Claims, 8 Drawing Sheets

(56) References Cited

OTHER PUBLICATIONS

Elber et al., "MATHSM: medial axis transform toward high speed machining of pockets," Computer Aided Design, vol. 37, No. 2, Feb. 2005, pp. 241-250.

Held et al., "A smooth spiral tool path for high speed machining of 2D pockets," Computer-Aided Design, vol. 41, No. 7, Jul. 2009, pp. 539-550.

Ibaraki et al., "On the removal of critical cutting regions by trochoidal grooving," Precision Engineering, vol. 34, No. 3, Jul. 2010, pp. 467-473.

* cited by examiner

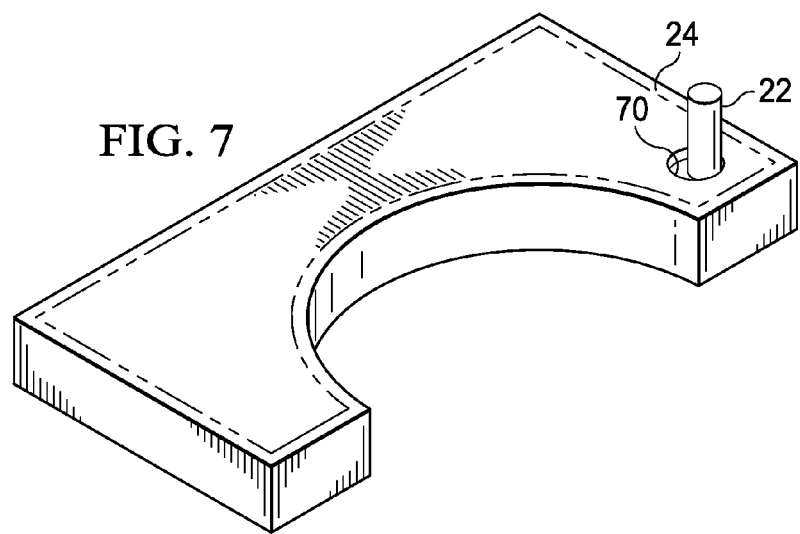
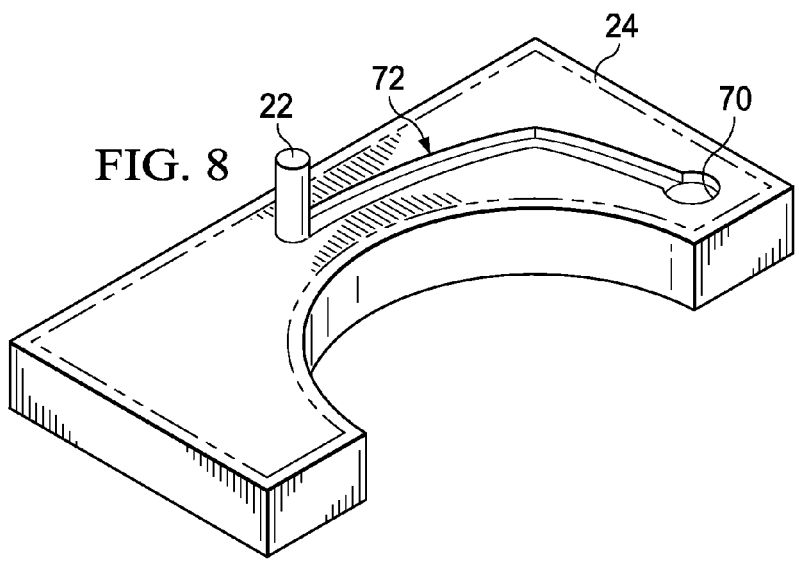
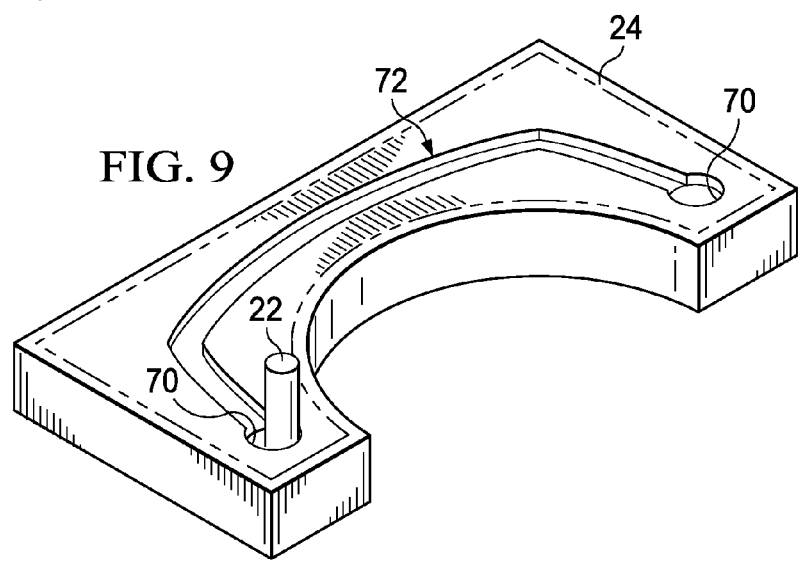

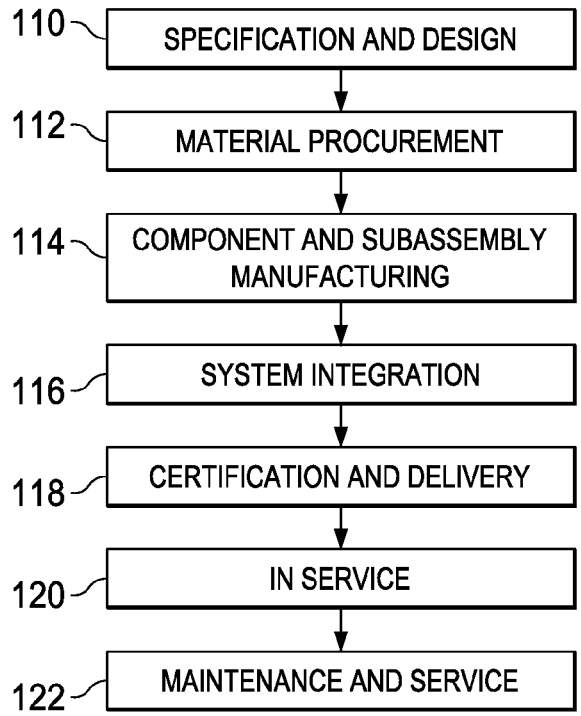
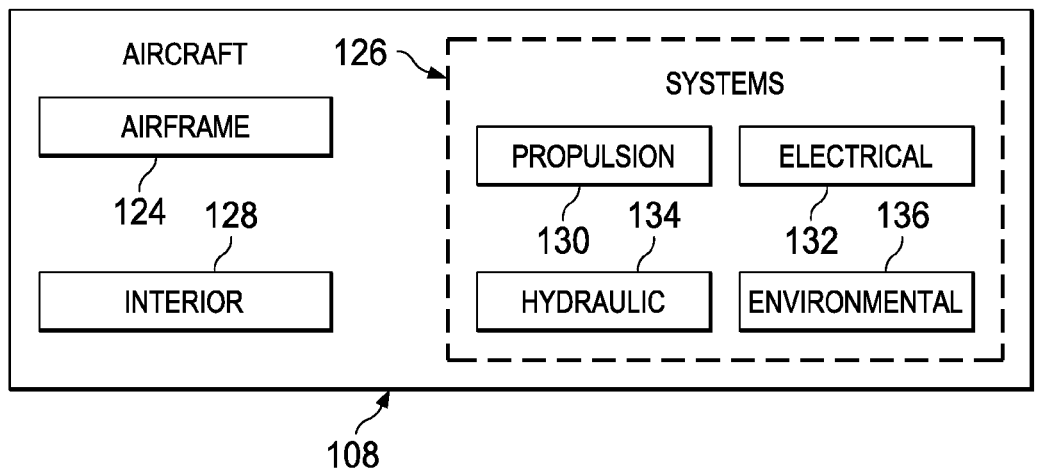

METHOD OF OPTIMIZING TOOLPATHS USING MEDIAL AXIS TRANSFORMATION

BACKGROUND INFORMATION

1. Field

The present disclosure generally relates to automated machining techniques, and deals more particularly with a method of optimizing toolpaths used by automatically controlled cutting tools.

2. Background

CAD/CAM (computer aided design/computer aided manufacturing) systems may be integrated with CNC (computer numerically controlled) systems to provide rapid, efficient machining of workpieces. CAM systems use various toolpath strategies to guide a cutting tool during rough machining operations in which the workpiece is machined to near net-shape. In one toolpath strategy, commonly referred to as constant-offset or parallel-offset, the degree of radial engagement of the cutting tool with the workpiece varies as the cutting tool moves along the toolpath. While the material removal rate (MRR) may be optimized along straight cuts, the feed rate must be reduced when the tool enters sharp curves or corners where the radial engagement increases.

In order to increase machining efficiency and reduce tool wear/breakage, adaptive type toolpath strategies have been developed in which full radial engagement of the cutting tool with the workpiece is maintained substantially throughout the rough machining operation. Based on full radial engagement of the cutting tool, the CAM system may calculate an axial cutting depth and feed rate that result in higher utilization of the available machine tool power. Although adaptive toolpath strategies may significantly increase cutting efficiency, the machine utilization rate is still not fully optimized. This is because, while a toolpath program may call for constant cutting tool feed rate, the machine may not be able to actually achieve a constant feed rate due to its inertial mass. For example, when the cutting tool reaches an outer cut area boundary, the machine is required to decelerate, stop, reverse direction and re-accelerate. The loss of efficiency due to these frequent changes in toolpath velocity and direction may be particularly severe along narrow or tight regions of a workpiece. In these regions, numerous, short back-and-forth passes of the cutting tool are necessary, each of which requires the cutting tool to decelerate, change direction and reaccelerate.

Accordingly, there is a need for a method of rough machining a workpiece using an adaptive toolpath strategy that increases machining efficiency, particularly along narrow or tight regions of an area being machined. There is also a need for a machining method that maintains the feed rate of a cutting tool at a substantially constant velocity while the cutting tool remains in substantially full engagement with the workpiece.

SUMMARY

According to the disclosed embodiments, an automated machining method is provided using an adaptive toolpath strategy that utilizes a greater amount of a machine tool's available power in order to increase material removal rate and reduce machining time. The need to decelerate, change direction and reaccelerate a cutting tool is significantly reduced. Long, smooth toolpaths are generated which allow a substantially constant feed rate to be maintained during substantially the entire rough machining operation. The method creates a pre-roughed condition that can be used as a starting point for rough machining that employs substantially 100 percent tool engagement and a feed rate matched to the maximum operating constraint the machine.

According to another embodiment, a method is provided of rough-machining a workpiece using a numerically controlled machine tool. The method comprises selecting a boundary defining the shape of an area of the workpiece to be machined, determining a medial axis of the shape, using the medial axis to generate a first set of toolpath data for guiding the movement of a cutting tool, machining a pre-roughing slot in the workpiece using the first set of toolpath data, generating a second set of toolpath data based on the geometry of the slot, and rough machining the workpiece using the second set of toolpath data. Determining the medial axis of the shape is performed using a computer implemented medial axis transform algorithm, and determining the medial axis includes generating multiple curves representing the shape, and then thinning the multiple curves by deselecting at least certain of the multiple curves. Generating the second set of toolpath data is performed using an adaptive toolpath algorithm. The medial axis transform algorithm includes a scaled medial axis transform. Deselecting the at least certain multiple curves is automatically performed using a programmed computer. Alternatively, deselecting the at least certain multiple curves includes visually presenting the multiple curves to a human, and the deselection is performed by the human. Rough machining the workpiece is commenced by locating the cutting tool within the slot and moving the cutting tool spirally outward from the slot in generally smooth curves. Generating the second set of toolpath data includes selecting a toolpath pattern that spirals outwardly from the slot. The rough machining includes moving the cutting tool spirally outward from the slot.

According to still another embodiment, a method is provided of rough-machining a workpiece having at least one narrow region. The method includes inputting a cut boundary to a computer that defines the shape of an area of the workpiece to be machined, using the computer to perform a medial axis transformation of the shape, including generating a set of medial axis curves describing the shape, selecting certain of the medial axis curves for use in generating a pre-roughing toolpath, using the computer to generate the pre-roughing toolpath based on the selected medial axis curves, automatically machining a pre-roughing slot in the workpiece using the pre-roughing toolpath to guide the cutting tool, using the computer to generate a roughing toolpath based on the geometry of the pre-roughing slot, automatically machining a remainder of the area of the workpiece using the roughing toolpath to guide the cutting tool. Using the computer to perform a medial axis transformation of the shape includes performing a scalar medial axis transformation. Automatically machining the remainder of the area of the workpiece includes using the roughing toolpath to guide the cutting tool in generally smooth curves spiraling outward from the pre-roughing slot. Selecting certain of the medial axes is performed automatically by the computer. Automatically machining the remainder of the area of the workpiece includes maintaining a substantially constant radial depth of cut throughout the roughing toolpath.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIGS. 7-9 are illustrations of perspective views showing the pre-roughing slot being cut based on the thinned medial axis skeletal curves shown in FIG. 5 and the toolpath shown in FIG. 6.

FIG. 13 is an illustration of a flow diagram of aircraft production and service methodology.

FIG. 14 is illustration of a block diagram of an aircraft.

DETAILED DESCRIPTION

Figure 1:
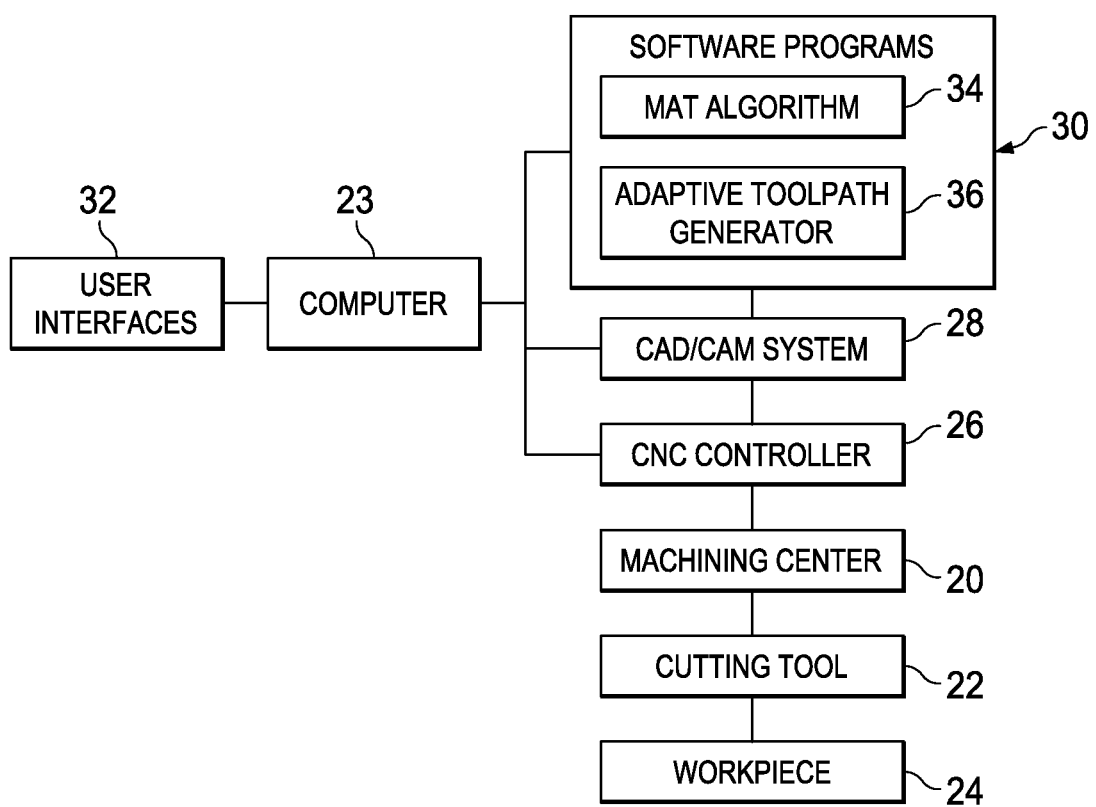
FIG. 1 is an illustration of a functional block diagram of a system for machining a workpiece using a medial axis transform to optimize an adaptive toolpath strategy.

Referring first to FIG. 1, a workpiece 24, which may comprise a solid material such as aluminum or titanium, may be machined using a cutting tool 22 driven by a machining center 20. The machining center 20 may comprise an automated multi-axis machine that displaces the cutting tool 22 and the workpiece 24 relative to each other. The machining center 20 may be automatically controlled using a programmed controller, such as the CNC (computer numerically controlled) controller 26. The machining center 20 may comprise, for example and without limitation, a 3-axis or 5-axis mill having a rotating spindle (not shown) for rotating the cutting tool 22. The cutting tool 22 may comprise, without limitation, an end-mill 22 shown in FIG. 2. The CNC controller 26 may be coupled with a CAD/CAM (computer aided design/computer aided manufacturing) system 28 having CAM software (not shown) and access to one or more software programs 30. In the illustrated embodiment, the software programs 30 include at least a suitable MAT (medial axis transform) algorithm, and an adaptive toolpath generator 36. A general purpose programmed computer 23 provided with user interfaces (e.g. input devices, displays, etc.) is coupled with the CADS/CAM system 28 and the CNC controller, and has access to the software programs 30.

Figure 2:
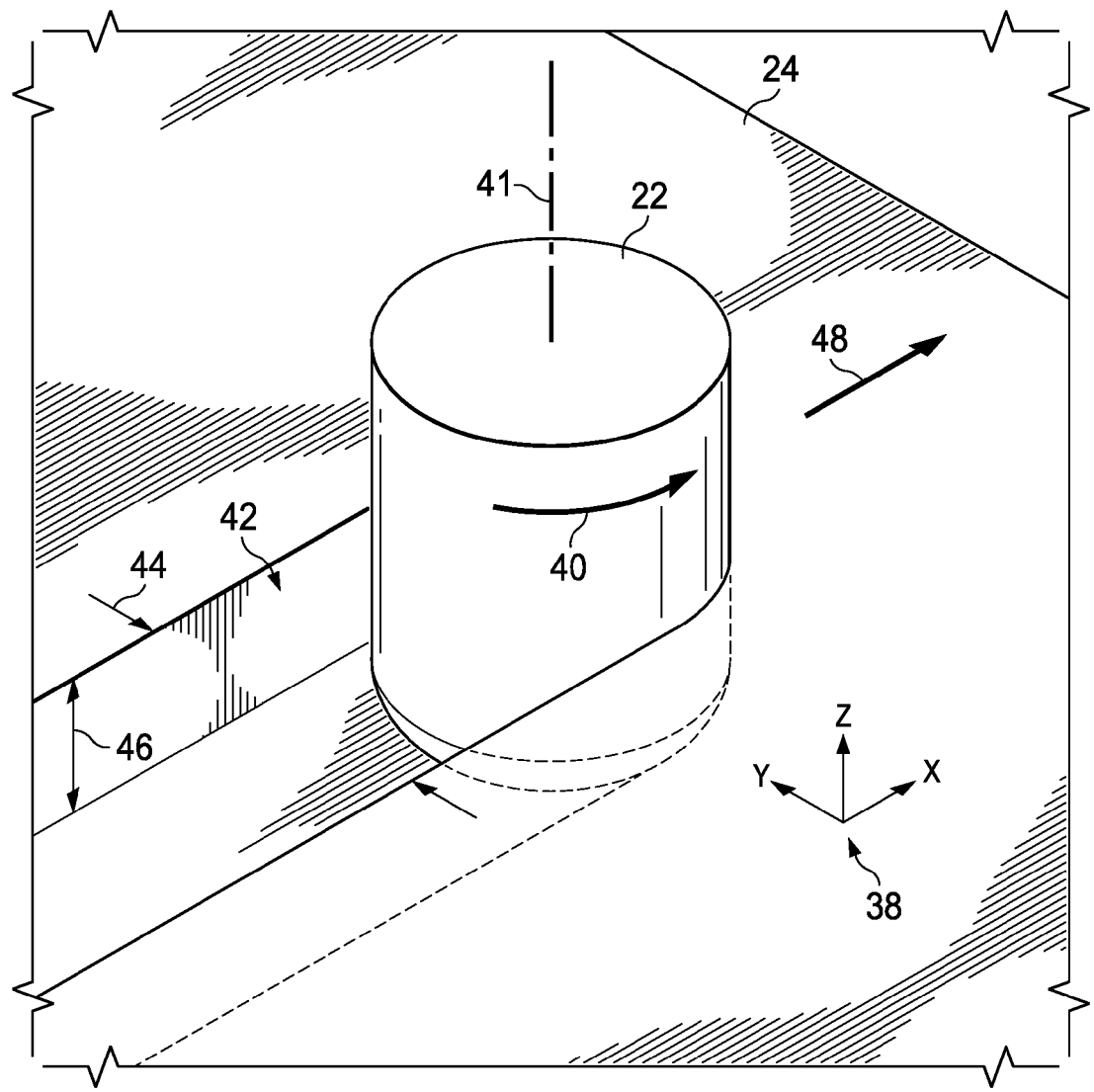
FIG. 2 is an illustration of a perspective view of a cutting tool in full radial engagement with a workpiece.

Referring to FIG. 2, the cutting tool 22 rotates 40 about an axis 41 corresponding to the machine tool spindle (not shown), which in the illustrated example is the Z-axis in an orthogonal XYZ coordinate system 38 of the machining center 20 in FIG. 1. The machining center 20 moves the cutting tool 22 along a toolpath 48 that is generated by the CAD/CAM system 28 and controlled by the CNC controller 26. The cutting tool 22 has a radial depth of cut 44 in the X-Y plane, controlled by the machining center 20. In the illustrated example, the radial depth of cut 46 is a full slot cut 42 in which the cutting tool 22 has maximum radial engagement with the workpiece 24. The machining center 20 moves the cutting tool 22 over the workpiece 24 along the toolpath 48 in the X-Y plane. The cutting tool 22 has an axial depth of cut 46 determined by the CAD/CAM system 28 and controlled by the CNC controller 26.

Figure 3:
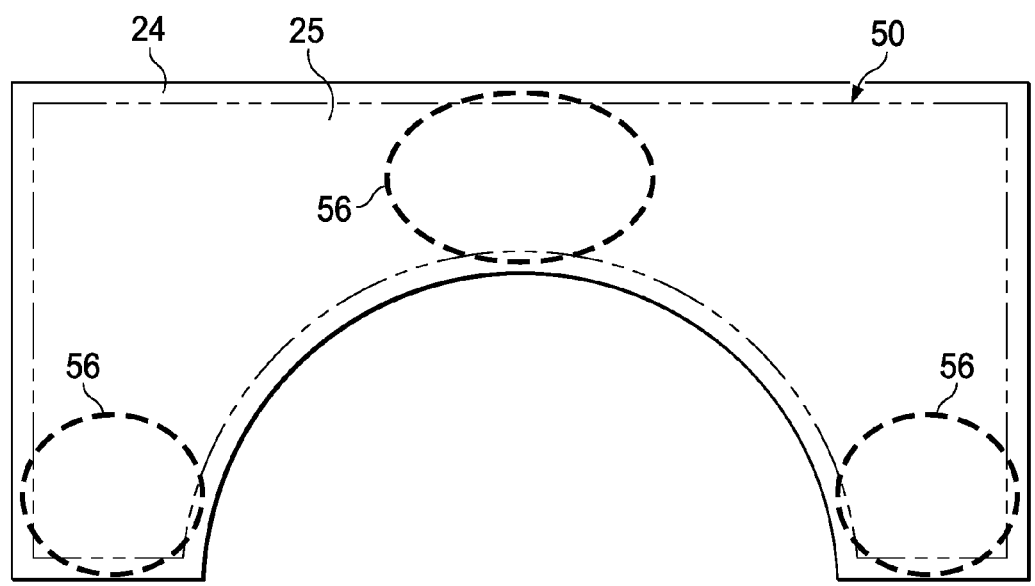
FIG. 3 is an illustration of a plan view of a workpiece showing the cut boundary of an area to be rough machined.

FIG. 3 illustrates a typical workpiece 24 having a workpiece area 25 that requires rough machining. The workpiece area 25 is defined by a cut area boundary 50, and may include one or more narrow regions 56. As used in this description, "narrow region" includes but is not limited to tight spaces, small areas, corners, channels or other narrowings within the cut area boundary 50. In accordance with the disclosed embodiments, the workpiece area 25 may be rough machined using an adaptive toolpath strategy that is specifically optimized to the shape of the area 25 to be machined. As will be discussed below in more detail, this optimization is achieved by computing the medial axis skeletal curves of the area 25 to be rough machined, cutting a pre-roughed slot in the workpiece 24, and then generating an optimized adaptive toolpath that is based on the geometry of the pre-roughed slot and is used to complete the rough machining process. By optimizing the adaptive toolpath in this manner, inefficiencies associated with acceleration and deceleration of the cutting tool 22 in the narrow regions 56 may be substantially reduced, Attention is now directed to FIG. 4 which illustrates a set of medial axis skeletal curves 68 that have been computed for the shape of the workpiece area 25 defined by the cut area boundary 50 shown in FIG. 3. The medial axis skeletal curves 68 includes a set of inner curves 60a, 68b, 68c, and a series of outer, diagonal skeletal curves 68d. The medial axis skeletal curves 68 are computed by the CAD/CAM system 28 using the computer 23 (FIG. 1) and the MAT 34. The MAT 34 may comprise any suitable, commonly available MAT algorithm, such as without limitation, a scaled medial axis transform that automatically thins a set of generated medial axis curves. Generally, a medial axis transformation is a mathematical technique used to extract the shape of a polygon—a process that is sometimes referred to as finding its skeleton, and the medial axis is sometimes referred to as the topological skeleton of a shape. The medial axis of a shape is a set of all points having more than one closest point on the shape's boundary. In two dimensions, the medial axis of a planar curve S is the locus of the centers of circles that are tangent to the curve S and in two or more points, where all such circles are contained in S. Stated in another way, the medial axis curve is the locus of the center of all those circles that fit within the cut area boundary 50 and are not within another circle.

Figure 4:
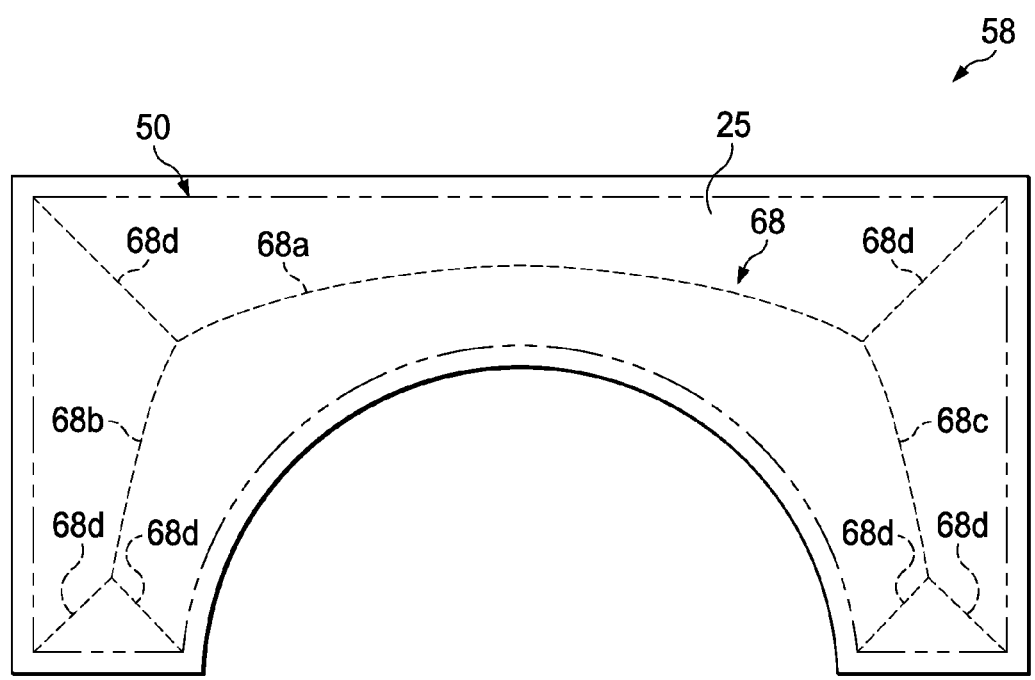
FIG. 4 is an illustration of a plan view of the workpiece showing medial axis skeletal curves computed for the shape defined by the cut boundary shown in FIG. 3.

FIG. 4 shows the initial results of the medial axis transformation of the area 25, defined by the cut area boundary 50, and is representative of an image that may be displayed to a human user on a computer screen (not shown) forming part of the user interfaces 32 (FIG. 1). Because it may not be necessary or efficient to use all of the medial axis curves yielded by the medial axis transformation, the medial axis curves 68 may be thinned, i.e. reduced in number, through a selection process, in which the curves that are most useful or practical are selected, and the remaining curves are ignored or "deselected". This selection process may be performed automatically by the CAD/CAM system 28, or semi-automatically by a user providing appropriate selection instructions to the CAD/CAM system 28. In the present example either the CAD/CAM system or the user may, for example, deselect the outer, diagonal curves 68d, resulting in a display similar to that shown in FIG. 5 in which the skeletal curves 68 have been thinned to a generally centrally located skeletal curve 68a, and two outer skeletal curves 68b, 68c.

Figure 5:
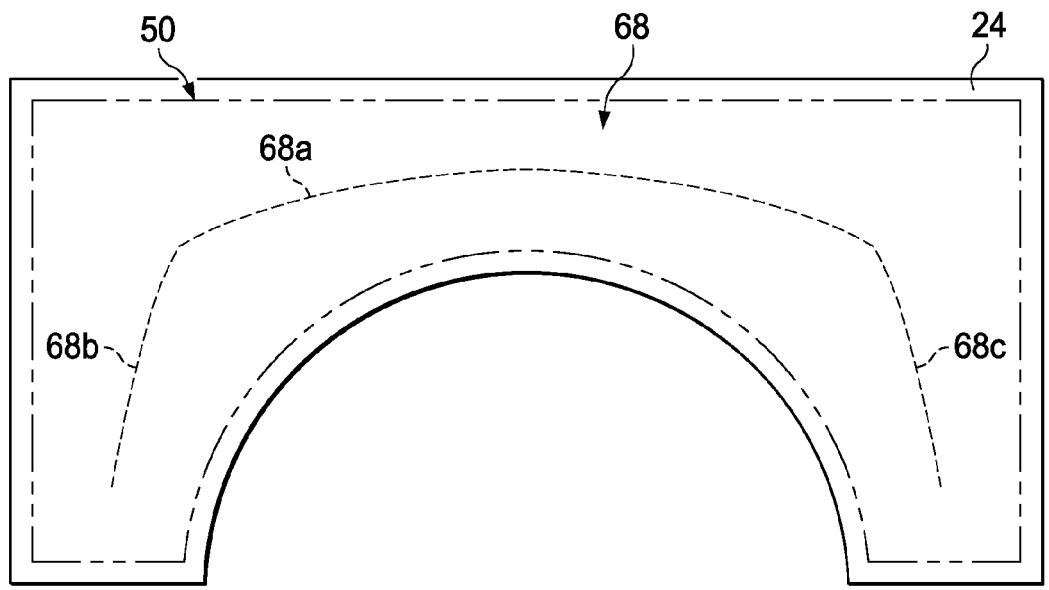
FIG. 5 is an illustration similar to FIG. 4 after thinning of the medial axis skeletal curves.
Figure 6:
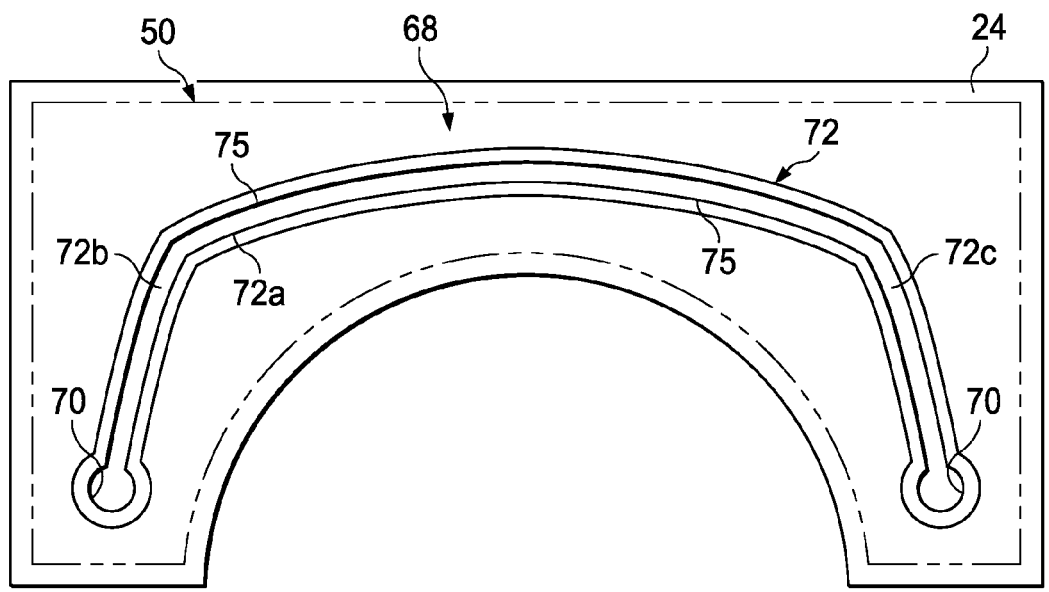
FIG. 6 is an illustration of a plan view of the workpiece showing the location of the pre-roughing slot and the pre-roughing toolpath used to cut the slot.

Referring now to FIG. 6, using the location of the thinned medial axis skeletal curves 68 shown in FIG. 5, CAD/CAM system 28 (FIG. 1) generates a pre-roughing slot toolpath 75. The cutting tool 22 follows the pre-roughing toolpath 75 to cut a pre-roughing slot 72 in the workpiece 24 that substantially follows the thinned medial axis skeletal curves 68. Referring to FIGS. 7-9, cutting of the pre-roughing slot 72 begins with the cutting tool 22 cutting a circular recess 70 in the workpiece 24, centered at one end of the thinned medial axis curves 68 shown in FIG. 5. Then, as shown in FIG. 8, cutting tool 22 proceeds to cut the full length of the slot 72, ending in a second circular recess 70 (FIG. 9) centered at the other end of the thinned medial axis curves 68. Depending on the desired final axial depth of the slot 72, it may be necessary for the cutting tool 22 to make several passes though the workpiece 24, in which a layer of material is removed with each pass. The slot may be cut to the final axial depth to which the workpiece 24 is rough machined, or, alternatively, successive layers of the slot 72 may be machined as the remainder of the workpiece 24 is being rough machined as described below.

Figure 10:
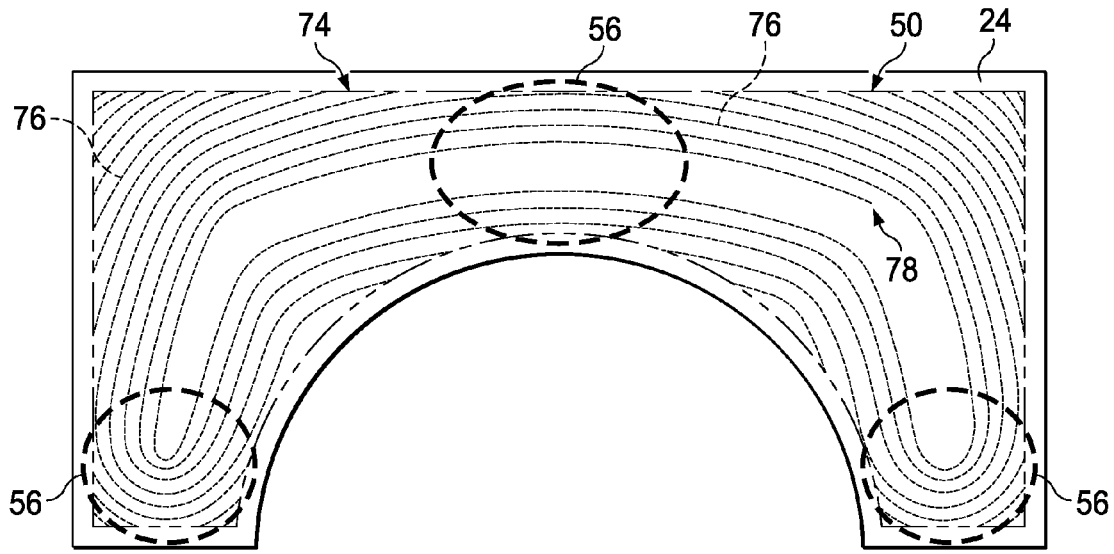
FIG. 10 is an illustration of a plan view of the workpiece showing an optimized adaptive toolpath based on the geometry of the pre-roughing slot shown in FIG. 6.

Attention is now directed to FIG. 10 which illustrates an optimized adaptive toolpath 76 that is generated by the CAD/CAM system 28 based on the geometry of the pre-roughing slot 72. The cutting tool 22 begins the roughing process at a starting position 78 that is inside the pre-roughing slot 72. The cutting tool 22 then moves in broad, substantially smooth curves around the slot 72, forming an outward spiral pattern. The toolpath 76 is substantially continuous within the narrow regions of the workpiece 24, and does not require either reversal of the direction of travel of the cutting tool 22, or substantial deceleration and acceleration of the cutting tool 22.

Figure 11:
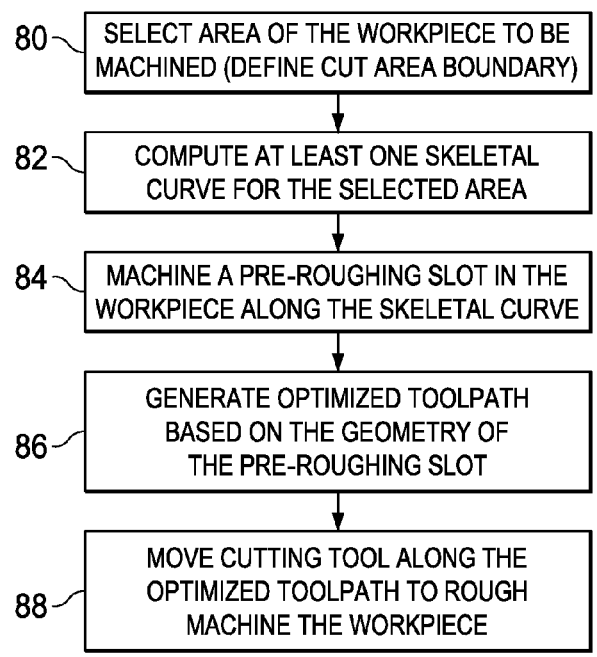
FIG. 11 is an illustration of a flow diagram of a method of machining a workpiece using medial axis curves to optimize an adaptive toolpath strategy.

Attention is now directed to FIG. 11 which broadly illustrates the steps of a method of machining a workpiece 24 using an adaptive toolpath technique optimized through the use of a medial axis transform, as previously described. Beginning at step 80, an area 25 of the workpiece 24 to be machined is selected, which is the cut area boundary 50. At step 82, at least one skeletal curve 68 for the selected area 25 is computed. At step 84, a pre-roughing slot 72 is machined in the workpiece 24, substantially along the computed skeletal curve 68. At step 84, a toolpath 76 is generated that is based on the geometry of the pre-roughing slot 72. At step 84, the cutting tool 22 is moved along the optimized toolpath 76 to rough machine the workpiece 24 to the desired axial depth. At step 86, an optimized toolpath based on the geometry of the pre-roughing slot is generated. At step 88, the cutting tool is moved along the optimized toolpath to rough machine the workpiece.

Figure 12:
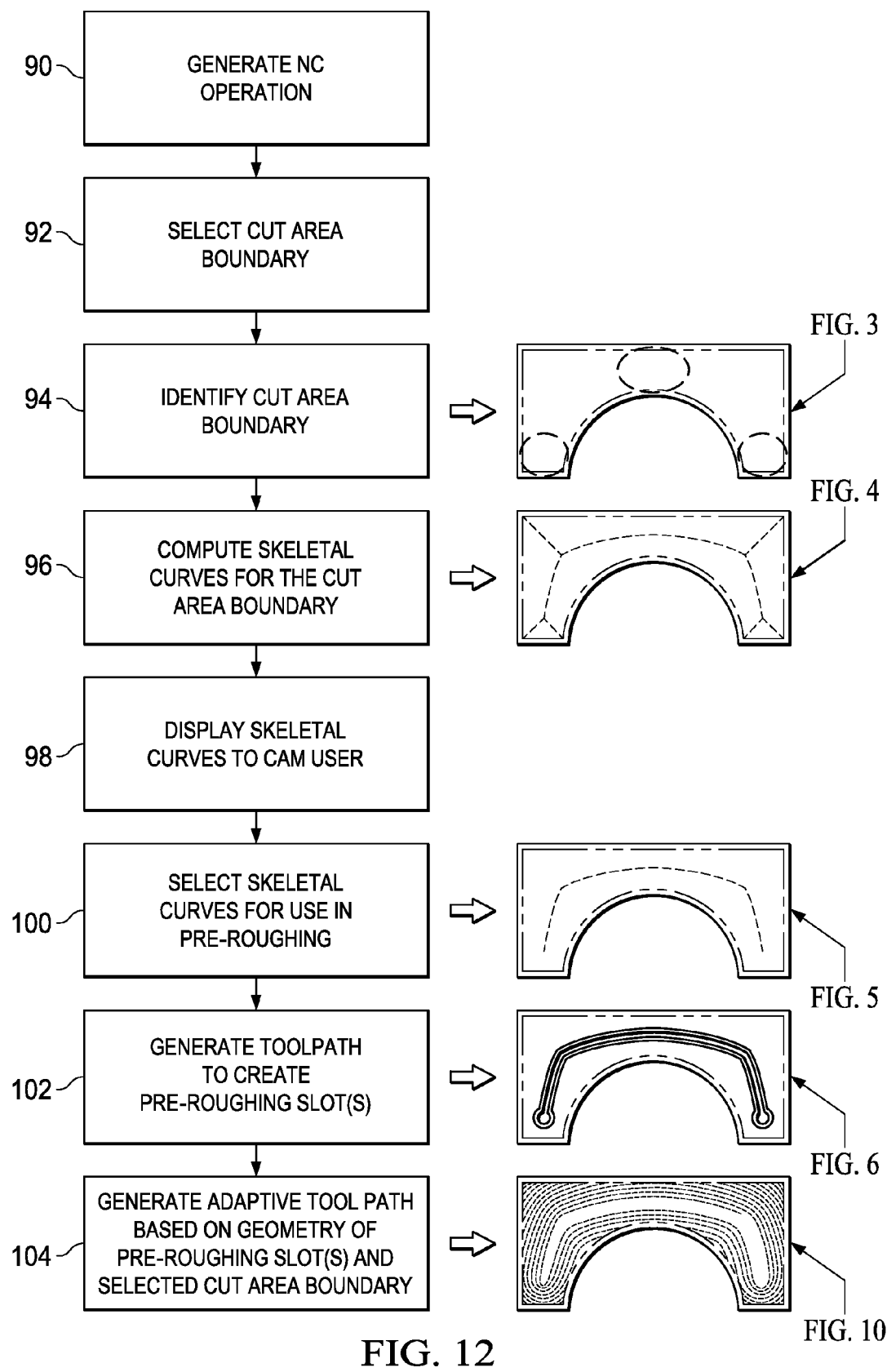
FIG. 12 is an illustration of a flow diagram showing additional details of the method shown in FIG. 11.

FIG. 12 illustrates additional details of the method shown in FIG. 11. Beginning at 90, an NC (numerically controlled) operation is generated which may include selecting a CAD file that digitally describes the workpiece 24 to be machined, and generating a CNC program to perform the machining operation. At step 92 a cut area boundary 50 is selected defining the area 25 to be rough machined. The cut area boundary 50 may be selected, for example, such that it excludes areas of the workpiece 24 that have already been rough machined. The selection process in step 92 may be performed by a user, or automatically under computer control.

At step 96, the medial axis skeletal curves are computed for the cut area boundary 50 selected in step 94, and at step 98, the computed medial axis skeletal curves may be displayed to a human user on a display screen. At step 100, medial axis skeletal curves computed at step 96 and displayed at step 98 are selected for use in a pre-roughing operation in which a first set of pre-roughing toolpath data is generated that is used to machine the pre-roughing slot 72. The selection process in step 100 may be performed by a user, or automatically by a computer 23. At step 100, the computed skeletal curves are thinned to a desired set. At step 102, a second set of roughing toolpath data is automatically generated by the computer 23 which define a toolpath for creating the pre-roughing slot 72. Finally, at step 104, an optimized adaptive toolpath 76 is generated by the computer 23 based on the geometry of the pre-roughing slot 72 and the cut area boundary 50 selected at step 94. Following generation of the optimized adaptive toolpath 76 at step 104, the workpiece 24 may be rough machined.

Embodiments of the disclosure may find use in a variety of potential applications, particularly in the transportation industry, including for example, aerospace, marine, automotive applications and other applications requiring machined workpieces. Thus, referring now to FIGS. 13 and 14, embodiments of the disclosure may be used in the context of an aircraft manufacturing and service method 106 as shown in FIG. 13 and an aircraft 108 as shown in FIG. 14. Aircraft applications of the disclosed embodiments may include, for example, without limitation, machining any of a variety of parts and components of solid material, and particularly metals such as aluminum and titanium. During pre-production, exemplary method 106 may include specification and design 110 of the aircraft 108 and material procurement 112. During production, component and subassembly manufacturing 114 and system integration 116 of the aircraft 108 takes place. Thereafter, the aircraft 108 may go through certification and delivery 118 in order to be placed in service 120. While in service by a customer, the aircraft 108 is scheduled for routine maintenance and service 122, which may also include modification, reconfiguration, refurbishment, and so on.

Each of the processes of method 106 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14, the aircraft 108 produced by exemplary method 106 may include an airframe 124 with a plurality of systems 126 and an interior 128. Examples of high-level systems 126 include one or more of a propulsion system 130, an electrical system 132, a hydraulic system 134, and an environmental system 136. Any number of other systems may be included. Although an aerospace example is shown, the principles of the disclosure may be applied to other industries, such as the marine and automotive industries.

Systems and methods embodied herein may be employed during any one or more of the stages of the production and service method 106. For example, components or subassemblies corresponding to production process 102 may be fabricated or manufactured in a manner similar to components or subassemblies produced while the aircraft 108 is in service. Also, one or more apparatus embodiments, method embodiments, or a combination thereof may be utilized during the production stages 114 and 116, for example, by substantially expediting assembly of or reducing the cost of an aircraft 108. Similarly, one or more of apparatus embodiments, method embodiments, or a combination thereof may be utilized while the aircraft 108 is in service, for example and without limitation, to maintenance and service 122.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of machining a workpiece using an automatically controlled cutting tool, comprising:
selecting a cut boundary defining a shape of an area of the workpiece to be machined;
determining a medial axis transformation of the shape, including generating a set of medial axis curves describing the shape;
selecting at least one of the medial axis curves for use in generating a pre-roughing toolpath;
generating the pre-roughing toolpath based on the at least one of the medial axis curves;
automatically machining a pre-roughing slot in the workpiece using a cutting tool and the pre-roughing toolpath guiding the cutting tool via cutting a first circular recess comprising a first desired axial depth into the workpiece, centered at a first end of the medial axis, cutting a full length of the pre-roughing slot, and then cutting a second circular recess comprising a second axial depth into the workpiece, centered at a second end of the medial axis;
generating a roughing toolpath using a constant radial depth of cut of a cutting tool with the workpiece, based on a geometry of the pre-roughing slot, such that the roughing toolpath comprises a starting position, for the cutting tool, inside the pre-roughing slot;
automatically machining a remainder of the area of the workpiece using the cutting tool and the roughing toolpath to guide the cutting tool; and
automatically machining the remainder of the area of the workpiece using the roughing toolpath to guide the cutting tool in curves spiraling outward from the pre-roughing slot such that the cutting tool precludes a need for at least one of: a reversal of a direction of travel of the cutting tool, and a substantial deceleration and acceleration of the cutting tool.

2. The method of claim 1, wherein computing the at least one skeletal curve is performed using a medial axis transformation of a shape of the area.

3. The method of claim 1, wherein a multiple number of skeletal curves is computed and the method further comprises thinning the multiple number of the skeletal curves.

4. The method of claim 3, wherein thinning the multiple number of skeletal curves is automatically performed by a programmed computer.

5. The method of claim 3, wherein thinning the multiple number of the curves includes:
visually presenting the multiple number of curves automatically
thereby enabling manual thinning.

6. The method of claim 1, further comprising generating a set of pre-roughing toolpath data, and wherein machining the pre-roughing slot includes using a computerized controller and the pre-roughing toolpath data to control a movement of the cutting tool.

7. The method of claim 1, wherein:
moving the cutting tool along the toolpath includes beginning the toolpath at the starting point that is within the pre-roughing slot.

8. The method of claim 1, wherein generating the toolpath includes selecting a toolpath pattern that spirals outwardly from the pre-roughing slot.

9. A method of rough-machining a workpiece using a numerically controlled machine tool, comprising:
selecting a cut boundary defining a shape of an area of the workpiece to be machined;
determining a medial axis transformation of the shape, including generating a set of medial axis curves describing the shape;
selecting at least one of the medial axis curves for use in generating a pre-roughing toolpath;
generating the pre-roughing toolpath based on the at least one of the medial axis curves;
automatically machining a pre-roughing slot in the workpiece using a cutting tool and the pre-roughing toolpath guiding the cutting tool via cutting a first circular recess comprising a first desired axial depth into the workpiece, centered at a first end of the medial axis, cutting a full length of the pre-roughing slot, and then cutting a second circular recess comprising a second axial depth into the workpiece, centered at a second end of the medial axis;
generating a roughing toolpath using a constant radial depth of cut of a cutting tool with the workpiece, based on a geometry of the pre-roughing slot, such that the roughing toolpath comprises a starting position, for the cutting tool, inside the pre-roughing slot;
automatically machining a remainder of the area of the workpiece using the cutting tool and the roughing toolpath to guide the cutting tool; and
automatically machining the remainder of the area of the workpiece using the roughing toolpath to guide the cutting tool in curves spiraling outward from the pre-roughing slot such that the cutting tool precludes a need for at least one of: a reversal of a direction of travel of the cutting tool, and a substantial deceleration and acceleration of the cutting tool.

10. The method of claim 9, wherein, determining the medial axis of the shape is performed using a computer implemented medial axis transform algorithm.

11. The method of claim 9, wherein, determining the medial axis includes generating multiple curves representing the shape, and then thinning the multiple curves by deselecting at least certain of the multiple curves.

12. The method of claim 9, wherein generating the second set of toolpath data is performed using an adaptive toolpath algorithm.

13. The method of claim 9, wherein, the medial axis transform algorithm includes a scaled medial axis transform.

14. The method of claim 11, wherein deselecting the at least certain of the multiple curves is automatically performed using a programmed computer.

15. The method of claim 9, wherein deselecting the at least certain multiple curves includes:
visually presenting the multiple.

16. The method of claim 9, wherein generating the second set of toolpath data includes selecting a toolpath pattern that spirals outwardly from the slot.

17. The method of claim 9, wherein rough machining includes moving the cutting tool spirally outward from the slot.

18. A method of rough-machining a workpiece having at least one narrow region, comprising:
inputting a cut boundary to a computer that defines a shape of an area of the workpiece to be machined;
using the computer to perform a medial axis transformation of the shape, including generating a set of medial axis curves describing the shape;
selecting at least one of the medial axis curves for use in generating a pre-roughing toolpath;
using the computer to generate the pre-roughing toolpath based on the at least one of the medial axis curves;
automatically machining a pre-roughing slot in the workpiece using a cutting tool and the pre-roughing toolpath guiding the cutting tool via cutting a first circular recess comprising a first desired axial depth into the workpiece, centered at a first end of the medial axis, cutting a full length of the pre-roughing slot, and then cutting a second circular recess comprising a second axial depth into the workpiece, centered at a second end of the medial axis;
using the computer to generate a roughing toolpath using a constant radial depth of cut of a cutting tool with the workpiece, based on a geometry of the pre-roughing slot, such that the roughing toolpath comprises a starting position, for the cutting tool, inside the pre-roughing slot;
automatically machining a remainder of the area of the workpiece using the cutting tool and the roughing toolpath to guide the cutting tool; and
automatically machining the remainder of the area of the workpiece using the roughing toolpath to guide the cutting tool in curves spiraling outward from the pre-roughing slot such that the cutting tool precludes a need for at least one of: a reversal of a direction of travel of the cutting tool, and a substantial deceleration and acceleration of the cutting tool.

19. The method of claim 18, wherein using the computer to perform the medial axis transformation of the shape includes performing a scaled medial axis transformation.

20. The method of claim 18, wherein selecting certain of the medial axes is performed automatically by the computer.

21. The method of claim 18, wherein automatically machining the remainder of the area of the workpiece comprises maintaining a desired radial depth of cut throughout the roughing toolpath.

22. The method of claim 18, wherein automatically machining the remainder of the area of the workpiece includes moving the cutting tool across the narrow region at a desired constant velocity.

* * * * *